Figure 1:
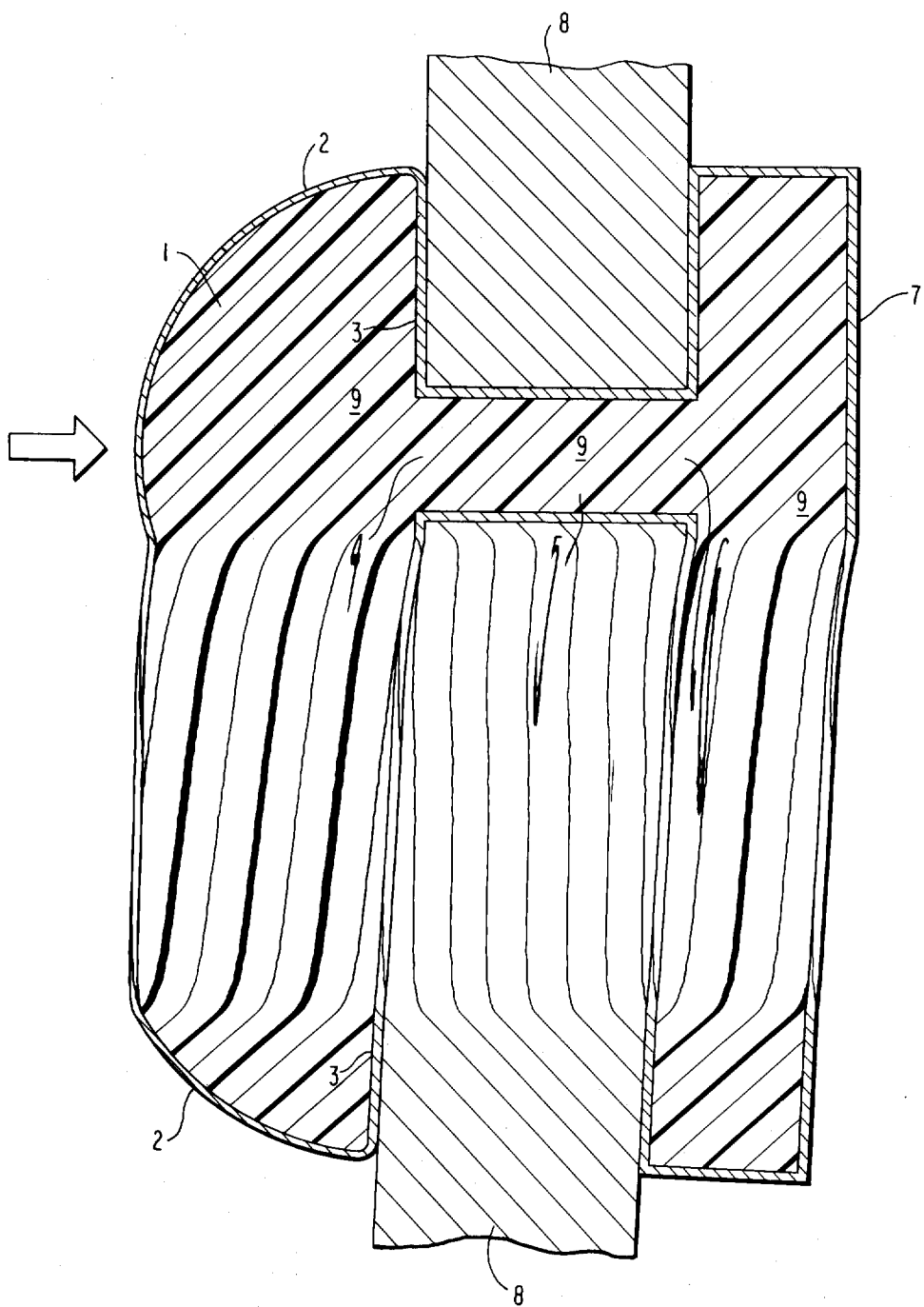

United States Patent [19]

Peterson

[11] 3,975,006

[45] Aug. 17, 1976

[54] IMPACT KINETIC ENERGY ABSORBER

[76] Inventor: Gerald H. Peterson, 901 Sherman, Apt. 518, Denver, Colo. 80203

[22] Filed: Jan. 17, 1975

[21] Appl. No.: 542,131

Related U.S. Application Data

[63] Continuation of Ser. No. 356,247, May 1, 1973, and a continuation of Ser. No. 433,612, Jan. 15, 1974, which is a continuation of Ser. No. 248,236, April 27, 1972.

[52] U.S. Cl. ............................... 267/139; 293/70; 188/1 C
[51] Int. Cl.² ............................................ F16F 7/12
[58] Field of Search ........... 267/116, 139, 140, 152, 267/153; 293/1, 60, 85, 89, 70; 188/1 C

[56] References Cited
UNITED STATES PATENTS

| | | | |
|---|---|---|---|
| 3,494,607 | 2/1970 | Rusch | 267/116 |
| 3,588,159 | 6/1971 | Duckett | 293/70 |
| 3,659,835 | 5/1972 | Peterson | 267/136 |
| 3,695,665 | 10/1972 | Matsuura | 293/70 |

*Primary Examiner*—James B. Marbert
*Attorney, Agent, or Firm*—Beveridge, Degrandi, Kline & Lunsford

[57] ABSTRACT

An impact kinetic energy absorber with automatic return in which the kinetic energy of impact is applied to an impact receiving container having a movable wall and substantially filled with plastic material which on impact is forced to be extruded through an orifice into a second plastic receiving container also substantially filled with plastic material so that on impact plastic material is extruded through said orifice to absorb kinetic energy and plastic material is compressed in said second container, which compressed plastic, after said impact forces plastic material to be extruded back through said orifice to return said impact receiving container and movable wall to the original position. In one embodiment a spring returns the plastic material to its pre-impact receiving position so that the plastic material is under a pressure below its yield point except only for that portion of the plastic that is being forced back through the orifice to return to its original pre-impact position.

8 Claims, 2 Drawing Figures

IMPACT KINETIC ENERGY ABSORBER

This application is a continuation of application Ser. No. 356,247, filed May 1, 1973, and a continuation of application Ser. No. 433,612, filed Jan. 15, 1974, which in turn is a continuation of Ser. No. 248,236, filed Apr. 27, 1972.

The entire disclosure of each of these related, copending applications is relied upon and incorporated herein by reference.

The invention relates to an impact kinetic energy absorber in which the kinetic energy of impact is absorbed by compressing plastic material in an impact receiving container having a movable wall for receiving the impact and forcing plastic material to be extruded through an orifice into a second container filled with plastic material so that plastic material under compression in said second container after said impact forces plastic material to be extruded back through said orifice and into said first container to return the movable wall thereof to its original position.

The invention also relates to an impact kinetic energy absorber in which the kinetic energy of impact is absorbed by forcing a plastic material through an orifice from one chamber to another under a pressure below the yield point pressure of the plastic so that the plastic is in the solid form except only for that portion being forced through the orifice, and a spring located between the place of receiving the impact on the support for the device so loaded that the plastic material after impact will return to its pre-impact position without the plastic being above its yield point pressure except only that portion being forced back through the orifice.

It is an object of this invention to provide an impact kinetic energy absorber which uses plastic material to act as a compressible spring to both absorb impact kinetic energy and return the device to its original position after impact and in addition to absorb kinetic energy by extrusion of the plastic material to damp both the impact and return strokes.

It is also an object of this invention to provide an impact kinetic energy absorber in which kinetic energy is absorbed by forcing plastic material through an orifice from one chamber to another with the plastic material below its yield point pressure except only for that portion being extruded through the orifice and having a spring between the impact receiving face and the support to assure return of the plastic material to its pre-impact position under pressure below its yield point except only for that portion being forced back through the orifice.

It is another object of this invention to provide an impact kinetic absorber having automatic reset as described above in which means for automatic reset on impact absorbs kinetic energy as a spring in addition to that absorbed by forcing said plastic material through said orifice.

Other objects will be apparent from the description of the specific embodiments set out below.

In general, the impact kinetic energy absorber of my invention absorbs kinetic energy of impact by forcing plastic material to be extruded through an orifice from a first container having a movable wall for receiving an impact into a second container filled with plastic material so that the plastic material in said second container will be compressed and act as a spring to force plastic material to be extruded back through said orifice and into said first container to return said movable wall to its original position after the impact. It is preferable that the plastic material in the device be substantially at its yield point pressure to assure full return and, even better at a pressure just a little below the yield point if and when leakage of the plastic material should be a problem when not in operation.

In another embodiment, the impact kinetic energy absorber of my invention absorbs kinetic energy on impact by extruding plastic material through an orifice in a container having plastic material under pressure below its yield point so that the plastic is in its solid form except for that portion extruded through an orifice between two portions of the container, one portion of the container having an impact receiving means with a spring between said impact receiving means and the support for the device to assure return of the impact receiving means to its pre-impact position after impact so said spring will force said plastic material back through the orifice with the plastic material being under pressure below its yield point except only that portion, which is forced back through the orifice to return to its pre-impact position.

Related prior art is illustrated by my U.S. Pat. Nos. 3,659,835 and 2,997,325; U.S. Pat. No. 3,053,526 to Giles A. Kendall, and my copending application Ser. No. 79,722, filed Oct. 12, 1970, entitled "Impact Kinetic Energy Absorber With Automatic Reset". The disclosures of all the foregoing are incorporated herein by reference. The prior art devices absorb kinetic energy of impact by the extrusion of plastic material through an orifice, but they do not disclose an arrangement for extruding plastic through an orifice with a resilient means to assure reset with the plastic material at a pressure below its yield point except for that portion being extruded through an orifice in a structure not using a piston or plunger.

Specific embodiments of my invention are described in detail hereinafter as illustrated in the accompanying drawings, in which:

The Figures are schematic showings of a section of such embodiments taken on the longitudinal axes thereof.

Figure 2:
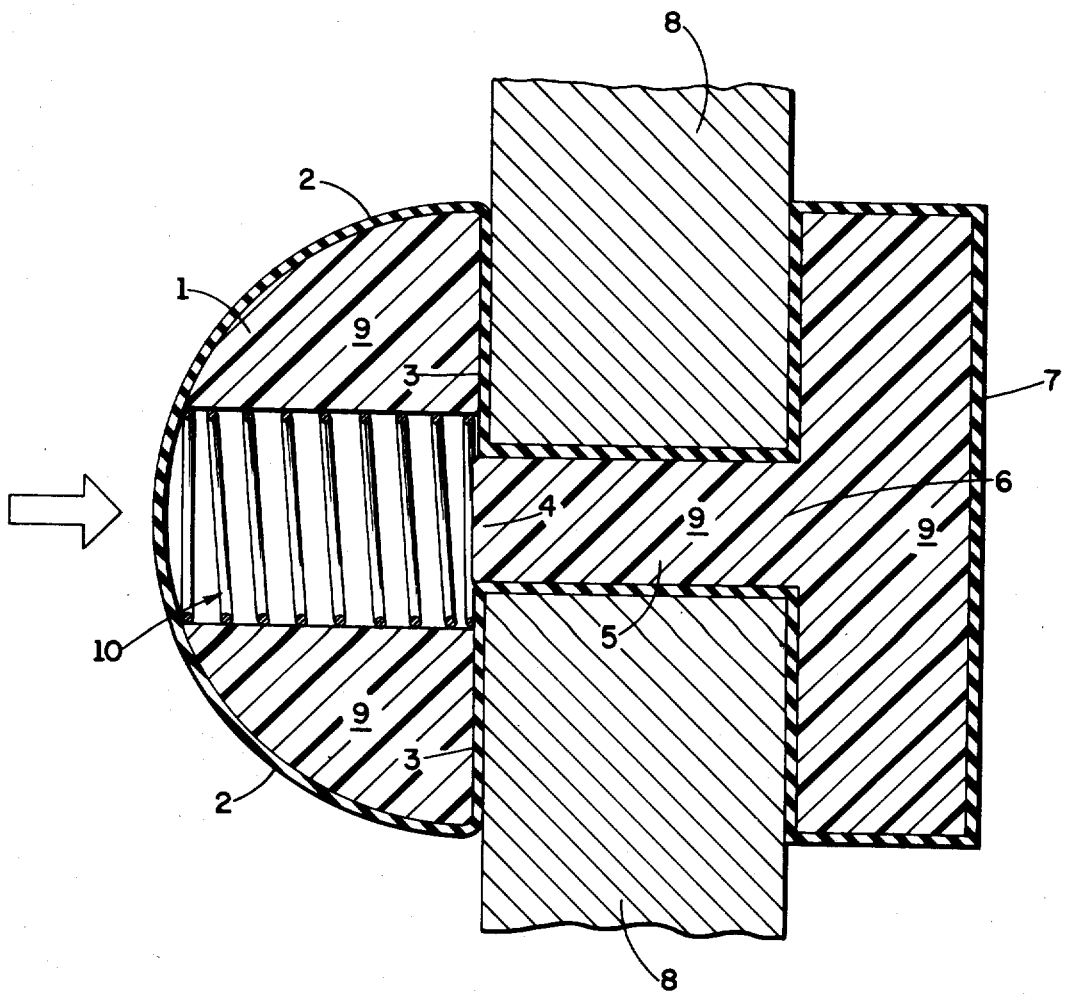

FIGS. 1 and 2 are schematic sections showing embodiments of the invention taken on the longitudinal axes where 1 is a first container having a movable wall 2 of flexible material for receiving an impact. At the back of container 1 is a fixed wall having a circular opening 4 which leads into a tube 5 which opening and tube provide an extrusion orifice for plastic material. At the other end of tube 5 is another opening 6 which leads into a second container 7. Support elements 8 hold the device in fixed position, especially walls 3 of container 1, tube 5 and container 7. Container 1, tube 5 and container 7 are filled with plastic material 9 which is both compressible and extrudable above its yield point pressure. Such a plastic material may be a silicone rubber, polyethylene, etc. depending upon the requirements for the particular use. The plastic material is preferably at its yield point pressure in container 1, tube 5 and container 7 when the device is not in operation.

It is a special improvement in accordance with this invention wherein a spring 10 (FIG. 2) is provided to be operable between the impact receiving movable flexible wall 2 and the support member 8 which, of course, is structurally connected to the second container 7. This spring is so loaded to assure the return of wall 2 to its pre-impact position with the plastic material 9 below its yield point pressure except for that being extruded back through the orifice. In FIG. 2, the plastic material is shown as removed from the area surrounding spring 10 for clarity in describing this invention.

As pointed out above, the spring 10 assures the return of the plastic from container 7 back into container 1 and returns flexible wall 2 to its pre-impact position with the plastic material below its yield point pressure except only that portion being extruded back through the orifice.

In use, the devices are placed to receive impacts substantially axially thereof against movable wall 2 with the device being held in fixed position by supports 8. On impact against wall 2, plastic material is extruded through the orifice consisting of hole 4 and tube 5 to absorb kinetic energy and on through hole 6 and into container 7 to compress the plastic material 9 in container 7 so it is compressed as a spring so that, after the impact, plastic material is returned through hole 6 and tube 5 back into container 1 to return movable wall 2 to its original position. To return all the way it is important that the plastic material in container 1, tube 5, and container 7 be at the yield point pressure when the device is not in operation. Spring 10 assures the return of the plastic material back into container 1 to reset flexible wall 2 to its pre-impact position with the plastic material below its yield point pressure except only that extruded through the orifice.

What is claimed is:

1. In a device for absorbing kinetic energy of impact in which kinetic energy is absorbed by forcing plastic material to be extruded through an orifice, the combination of a first container filled with plastic material, a second container, and an extrusion orifice between and interconnecting said first and second containers, said first container having a movable wall for extrusion of said plastic material from said first container and through said extrusion orifice and into said second container on impingement of an impact force against said movable wall, said second container being filled with a normally solid plastic material which is compressible on extrusion of said plastic material from said first container into said second container and is expansible upon abatement of impact force impingement against said movable wall of said first container to thereby extrude the plastic material received therein from said first container back through said extrusion orifice and back into said first container in a manner to substantially return said movable wall to its original position.

2. The device of claim 1 further including rigid support means secured between said first and second containers.

3. In the device as defined in claim 1 in which said pressure is a little below said yield point pressure.

4. In a device as defined in claim 1 in which the plastic material within said containers is substantially at the yield point pressure of the plastic material.

5. The device of claim 1 wherein said orifice is circular in cross-section.

6. In a device for absorbing kinetic energy of impact in which kinetic energy is absorbed by forcing plastic material to be extruded through an orifice, the combination of a first container filled with plastic material and having a movable wall for receiving an impact, a fixed wall opposite said movable wall, a second container filled with a compressible normally solid plastic material, and an extrusion orifice between said first container and said second container so that, upon impact against said movable wall, plastic material is extruded through said orifice into said second container to thereby compress the plastic material in said second container whereby, after said impact, the compressed plastic material in said second container forces plastic material to be extruded back through said orifice into said first container to thereby return said movable wall toward its original position, and resilient means operative between said impact receiving movable wall and said fixed wall and being so loaded that said resilient means maintains said plastic material below the yield point pressure to return said plastic material back through said orifice and return said movable wall to its pre-impact position with the plastic material below its yield point pressure except only that portion being extruded back through said orifice.

7. In the device of claim 6 in which said resilient means is a spring.

8. A device as defined in claim 1 in which said orifice is fixed in position between and relative to said two containers, and said movable member of said first container moves upon said impact relative to and toward said fixed orifice and relative to portions of said first container.

\* \* \* \* \*